United States Patent
Sirohi et al.

(10) Patent No.: US 12,242,638 B2
(45) Date of Patent: Mar. 4, 2025

(54) MECHANISMS TO PREDICT SYSTEM RESOURCE CONSUMPTION OF TRANSACTIONS

(71) Applicant: Salesforce, Inc., San Francisco, CA (US)

(72) Inventors: Arjun Kumar Sirohi, Uttarakhand (IN); Lakshman Martha, Chester Springs, PA (US); Sirisha Tummalapenta, Serilingampally (IN)

(73) Assignee: Salesforce, Inc., San Francisco, CA (US)

( * ) Notice: Subject to any disclaimer, the term of this patent is extended or adjusted under 35 U.S.C. 154(b) by 218 days.

(21) Appl. No.: 18/162,131

(22) Filed: Jan. 31, 2023

(65) Prior Publication Data

US 2024/0256700 A1 Aug. 1, 2024

(51) Int. Cl.
*G06F 21/62* (2013.01)
*G06F 16/23* (2019.01)

(52) U.S. Cl.
CPC ...... *G06F 21/6227* (2013.01); *G06F 16/2379* (2019.01)

(58) Field of Classification Search
CPC .......... G06F 21/6227; G06F 16/2379
USPC ........................................... 726/28
See application file for complete search history.

(56) References Cited

U.S. PATENT DOCUMENTS

| | | | | |
|---|---|---|---|---|
| 11,372,654 | B1* | 6/2022 | Battle | G06F 16/13 |
| 11,689,534 | B1* | 6/2023 | Smith | G06F 3/0482 |
| | | | | 726/4 |
| 11,693,979 | B2* | 7/2023 | Biazetti | G06F 16/2315 |
| | | | | 726/29 |
| 11,750,616 | B2* | 9/2023 | Chen | G06F 16/122 |
| | | | | 726/4 |

(Continued)

OTHER PUBLICATIONS

Securing Sales and Fusion Service, Section 3 Introduction to Role-Based Security for Sales and Service—Overview of Role-Based Access Control, Oracle (Copyright © 1994, 2023), 2 pages.

(Continued)

*Primary Examiner* — Thanh T Le
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed pertaining to determining whether execution of a transaction will exceed a system resource threshold. A computer system stores a precomputed permissions data structure in association with particular data stored in a database. That precomputed data structure may be used to determine whether a user can access the particular data. The computer system may capture metric information that pertains to parameters involved in different types of transactions that can be performed to recompute the precomputed permissions data structure. Upon receiving a request to perform a transaction that involves recomputing the permissions data structure, the computer system, may determine, based on the metric information and the transaction's par- (Continued)

ticular type, whether an execution of the transaction will exceed the system resource threshold. If the transaction exceeds the threshold, the computer system prevents the transaction from being executed and may provide suggestions to enable that transaction to be executed.

20 Claims, 7 Drawing Sheets

(56) References Cited

U.S. PATENT DOCUMENTS

| | | | |
|---|---|---|---|
| 11,775,687 B2* | 10/2023 | Chen | G06F 21/6218 |
| | | | 726/28 |
| 2002/0124196 A1* | 9/2002 | Morrow | G06F 1/3293 |
| | | | 713/320 |
| 2015/0101024 A1* | 4/2015 | Leggette | G06F 3/064 |
| | | | 726/4 |
| 2019/0361915 A1 | 11/2019 | Weaver et al. | |
| 2020/0026579 A1* | 1/2020 | Bahramshahry | G06F 9/5077 |
| 2021/0064655 A1* | 3/2021 | Prasad | G06F 9/5038 |
| 2021/0141704 A1* | 5/2021 | Glass | G06F 11/3017 |
| 2021/0280287 A1* | 9/2021 | Mahmood | G16H 10/60 |
| 2021/0342836 A1* | 11/2021 | Cella | H04L 9/3239 |
| 2021/0358032 A1* | 11/2021 | Cella | G06F 16/2379 |
| 2022/0084660 A1* | 3/2022 | Georgescu | G06N 3/08 |
| 2022/0121633 A1* | 4/2022 | Quader | G06F 16/213 |
| 2022/0229776 A1* | 7/2022 | Klarén | G06F 12/0646 |
| 2023/0078169 A1* | 3/2023 | Vallejo Urena | G06F 16/2246 |
| | | | 726/4 |
| 2023/0164129 A1* | 5/2023 | Volini | H04L 63/10 |
| | | | 713/159 |
| 2023/0331351 A1* | 10/2023 | Moffat | B63B 35/44 |

OTHER PUBLICATIONS

International Search Report and Written Opinion in PCT Appl. No. PCT/US2024/011956 mailed Apr. 9, 2024, 13 pages.
Poppe et al., "Moneyball : proactive auto-scaling in Microsoft Azure SQL database serverless", Proceedings of the VLDB Endowment, vol. 15, No. 6, Jun. 22, 2022 (Jun. 22, 2022), pp. 1279-1287, XP093017804, New York, NY ISSN: 2150-8097, DOI: 10.14778/3514061.3514073 Retrieved from the Internet: URL: https://dl.acm.org/doi/pdf/10.14778/3514061.3514073.
Mozafari et al. "Performance and resource modeling in highly-concurrent OLTP workloads", Proceedings of the 2013 international conference on Management of data, SIGMOD '13, Jan. 1, 2013 (Jan. 1, 2013), p. 301, XP055141625, New York, New York, USA DOI: 10.1145/2463676.2467800 ISBN: 978-1-45-032037-5.

* cited by examiner

*Data Object 111*

| Account ID | Owner | Account Name |
|---|---|---|
| A1 | Maria | Acme |
| | | |
| | | |

*Permissions Structure 112*

| Account ID | User | Access Level | Row Cause |
|---|---|---|---|
| A1 | Maria | Full | Owner |
| A1 | Frank | Read/Write | Manual |
| A1 | Strategy | Read | Rule |
| | | | |

Match on Account ID

MECHANISMS TO PREDICT SYSTEM RESOURCE CONSUMPTION OF TRANSACTIONS

BACKGROUND

Technical Field

This disclosure relates generally to computer systems and, more specifically, to various mechanisms to predict system resource consumption of transactions/operations.

Description of the Related Art

Enterprises routinely implement database management systems (or, simply "database systems") that enable users to store a collection of information in an organized manner that can be efficiently accessed and manipulated. A database system can implement any of a variety of different types of databases to store information, such as a relational database, a non-relational database, etc. During operation, a database system receives requests from users via applications or from other systems, such as another database system, to perform transactions on information stored in a database store of the database system. A system that utilizes a database may rely on access rules and policies to control user access to data and prevent unauthorized access to the database. For example, a rule may be defined to allow a certain user or group to access certain records stored at the database.

DETAILED DESCRIPTION

Figure 1:
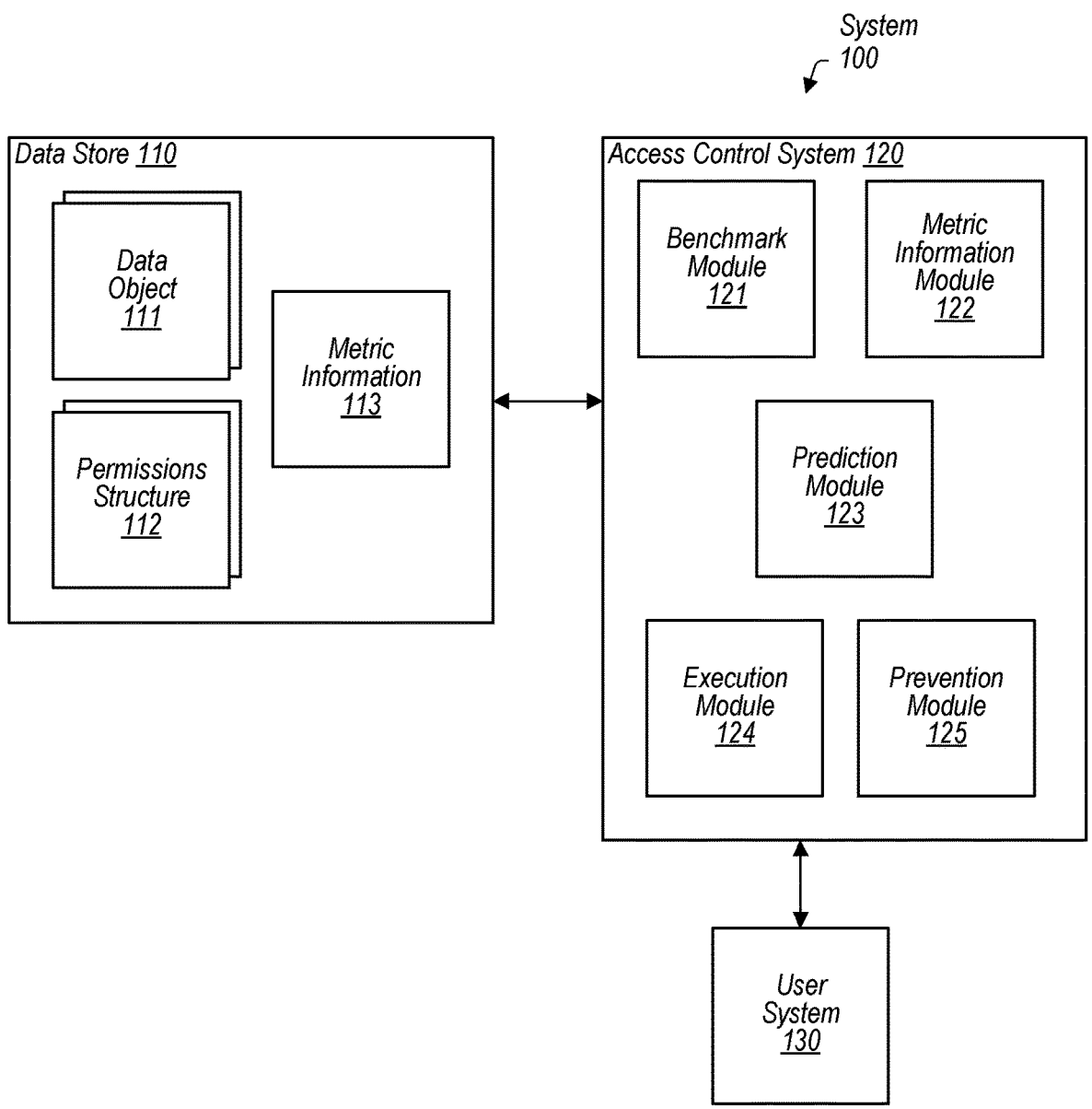
FIG. 1 is a block diagram illustrating example elements of a system comprising an access control system that controls user access to a data store, according to some embodiments.

A system can store and utilize access rules to control a user's access to data of a database of that system. When a user attempts to access records of a table, the system often performs a set of actions, such as checking the access rules and analyzing access inheritance, to determine whether the user can access those records. This process can take a considerable amount of time and thus the user experience can be impacted. Instead of analyzing every access rule with every user query for a data table, in some embodiments, record access data is precomputed and stored in an associated "rules" table that holds information about a set of users' permitted access to the data table. Accordingly, when a user attempts to access records from that table, the system checks the rules table and provides the user with the records if the rules table indicates that the user has permission. The system may recompute the record access data for a rules table when rule changes occur. For example, if a database administrator makes a change to a user's access permissions, then the system may execute a rule-changing transaction to update all the relevant rules tables to reflect the changes in the user's access permissions. The size of the rules tables and the computational expense of the rule-changing transactions often depend on the scale of the organizations hosted by the system and how organization administrators define access rules and policies.

Large organizations usually have thousands of users accessing the database, which can result in very large rules tables having thousands of access rules and millions of rows. Changes to the access rules for rules tables of that scale can result in rule-changing transactions that are large enough to present problems for processing in the system (e.g., utilizing enough database resources to reach the resource limits set in the database). In some cases, these transactions run for days before failing and thereby frustrating users of the system and consuming a significant amount of computing power for an extended period of time. It may thus be desirable to detect such rule-changing transactions and prevent them from proceeding and wasting valuable time and resources. The present disclosure addresses, among other things, the technical problem of how to predict and mitigate rule-change transactions that are too resource expensive.

In various embodiments described below, a computer system measures the metrics that factor in rule-changing transactions, identifies whether a rule-changing transaction will exceed system resource thresholds when the transaction is requested by a user, and takes appropriate action to prevent the execution of that transaction from proceeding if it will exceed the system resource thresholds. In various embodiments, benchmark tests are initially conducted in order to establish a baseline resource consumption for different types of rule-changing transactions. That resource consumption may be broken down into individual components (e.g., number of roles, number of users in the source role, etc.) and used to define a formula. Values/metrics are then collected for a given tenant of the system that map to those individual components—e.g., the number of roles for that given tenant are collected. When a rule-changing transaction is to be performed for a particular tenant, in various embodiments, the system retrieves the tenant's values/metrics and uses them as input into a formula (one that is relevant to the particular type of rule-change operations that is being executed) that determines the resource consumption of that rule-changing transaction. If the system determines, via the formula, that the rule-changing transaction will consume more system resources than a predefined threshold (e.g., 8 gigabytes of memory), then the rule-changing transaction is prevented from being executed. The system may notify the particular tenant that the requested rule-changing transaction will not proceed and further provide the tenant with suggestions to reduce the transaction's resource cost (e.g., reduce the number of roles).

These techniques may be advantageous over prior approaches as they allow for a system to predict and prevent computationally prohibitive rule-changing transactions from executing instead of executing such transactions and waiting a considerable amount of time for them to fail and potentially affect other resources. By preventing such transactions and notifying a user about a potential solution to allow for those transactions to be executed, the user experience is improved (e.g., the user does not waste time on a rule-changing transaction that will fail). Also, a provider of the system may save time and computing resources that can be costly to acquire from a cloud infrastructure provider. An example application of these techniques will now be discussed, starting with reference to FIG. 1.

Turning now to FIG. 1, a block diagram of a system 100 is shown. System 100 includes a set of components that may be implemented via hardware or a combination of hardware and software. In the illustrated embodiment, system 100 includes a data store 110, an access control system 120, and a user system 130. As further depicted, data store 110 includes data objects 111, permissions structures 112, and metric information 113. Also as depicted, access control system 120 includes a benchmark module 121, a metric information module 122, a prediction module 123, an execution module 124, and a prevention module 125. In some embodiments, system 100 is implemented differently than shown. As an example, access control system 120 might also interact (e.g., receive requests) with other systems (e.g., an application server) than user system 130.

System 100, in various embodiments, implements a platform service (e.g., a customer relationship management (CRM) platform service) that allows users of that service to develop, run, and manage applications. System 100 may be a multi-tenant system that provides various functionality to tenants (e.g., individual users, companies, governmental institutions, etc.) that are hosted by the multi-tenant system. Accordingly, system 100 may execute software routines from various, different entities (e.g., providers and tenants of system 100) as well as provide code, web pages, and other data to users, databases, and entities (e.g., a third-party system) that are associated with system 100. In various embodiments, system 100 is implemented using a cloud infrastructure provided by a cloud provider. As such, data store 110 and access control system 120 may execute on and utilize the available cloud resources of the cloud infrastructure (e.g., computing resources, storage resources, etc.) to facilitate their operations. For example, access control system 120 may execute in one or more virtual environments hosted on server-based hardware that is included within a datacenter. But in some embodiments, system 100 is implemented utilizing a local or private infrastructure as opposed to a public cloud. Other embodiments of system 100 may contain more or fewer components or modules than shown. For example, system 100 may include only data store 110 and access control system 120, while user system 130 operates as part of a different system.

Data store 110, in various embodiments, is a data repository that stores a collection of information organized in a manner that allows access and manipulation of that information. Data store 110 may be embodied in one or more physical or virtualized computer systems and include supporting software (e.g., storage servers) that enables access control system 120 to execute operations (e.g., accessing, storing, etc.) on the information that is stored at data store 110. For example, data store 110 might be implemented using Apache HBase™. In various embodiments, data store 110 utilizes a single or multiple storage devices that are connected together on a network (e.g., a storage attached network (SAN)) and configured to redundantly store information in order to prevent data loss. The storage devices may store data persistently and thus data store 110 can serve as a persistent storage for system 100. Also, in various embodiments, data written to data store 110 by one system (e.g., access control system 120) is accessible to other systems (e.g., another access control system 120).

In various embodiments, different types of data are stored at data store 110 using various data structures, including data objects 111. A data object 111 may be a database table, an index, or another type of data structure (e.g., a document object for a non-relational database). In the case of a data object 111 being a database table, a row of that data object 111 may correspond to a record that includes one or more values. A record, in various embodiments, is a key-value pair comprising data and a key that is usable to look up that record—the key may be a primary key composed of the values of one or more fields of the associated data object 111. In various embodiments, data objects 111 can store data for multiple tenants and thus include a field that defines tenant as a subset of data under which each record identifies a tenant.

As shown, data store 110 further stores, among other things, permissions structures 112 and metric information 113. A permissions structure 112, in various embodiments, is a data structure that stores record access data that can be used to control a user's access to records of an associated data object 111. An example of a data object 111 and an example of a permission structure 112 are discussed in more detail with respect to FIGS. 2A-B. Metric information 113, in various embodiments, describes metrics relating to tenants (e.g., organizations), data objects 111, and/or permissions structures 112. Metric information 113 may be used by access control system 120 to determine if a particular rule-changing transaction will exceed a system resource threshold and thus should be prevented from executing. Metric information 113 is discussed in more detail with respect to FIG. 4.

Access control system 120, in various embodiments, manages access to the data of data store 110. In some embodiments, access control system 120 is a database server that provides database services, such as data storage, data retrieval, and data manipulation. Access control system 120 may thus receive database requests to perform database transactions-a database request may be received from user system 130 via an application server that uses an established database connection. A database transaction, in various embodiments, is a logical unit of work (e.g., a set of database statements) to be executed in relation to data store 110. For example, processing a database transaction may include executing a SELECT statement to select and return one or more records from one or more data objects 111 in a response to the issuer of the database request. To determine whether those records can be returned, in various embodiments, access control system 120 accesses one or more permissions structures 112 that correspond to the one or more data objects 111 and evaluates their record access data. In some embodiments, access control system 120 is an application server that interacts with a database server on behalf of a user of user system 130. As such, access control system 120 may receive communications from user system 130 and provide requests (e.g., rule-changing requests, data update requests, etc.) to the database server to perform work in association with the data of data store 110 and on behalf of the user of user system 130. Access control system 120 may also implement both the application server and the database server, in various cases.

Access control system 120 may receive requests from user system 130 or another entity to insert, update, or remove one or more access rules that affect users' access to data store 110. In various embodiments, processing the requests involves recomputing the record access data stored in one or more permissions structures 112. Thus, access control system 120 may execute or cause to be executed a rule-changing transaction to recompute the record access data. Prior to executing a rule-changing transaction or causing it to be executed, in various embodiments, access control system 120 predicts whether the transaction will exceed a set of system resource thresholds (e.g., utilize more than 8 gigabytes of system memory). To facilitate that prediction, access control system 120 includes various executable software modules. Benchmark module 121, in various embodiments, performs benchmark tests for various rule-changing transactions to generate benchmarks that enable a baseline resource consumption to be determined for those rule-changing transactions. Benchmark module 121 is discussed in more detail with respect to FIG. 3. Metric information module 122, in various embodiments, collects metrics for different tenants of system 100 that relate to individual components that affect the resource consumption of the various rule-changing transactions. Metric information module 122 is discussed in more detail with respect to FIG. 3. Prediction module 123, in various embodiments, predicts whether a rule-changing transaction will exceed a system resource threshold based on metrics collected by metric information module 122 and one or more formulae. Prediction module 123 may then interact with either execution module 124 or prevention module 125 based on that prediction. If the rule-changing transaction is permitted to proceed, then execution module 124 executes or causes to be executed that transaction to recompute one or more permission structures 112; otherwise, prevention module 125 prevents the transaction from being executed.

User system 130, in various embodiments, is a computer system operated by a user and used to interact with other components of system 100, such as access control system 120. User system 130 may issue requests to access control system 120 for information stored in data store 110. In some instances, access control system 120 provides a user interface to user system 130 that allows for a user to send the requests to access control system 120. In other instances, the user may use a command line tool or another mechanism to cause those requests to be sent. In some embodiments, an application server or another system (not shown) can also be configured to issue requests to access control system 120 for information stored in data store 110.

Figures 2A, 2B:
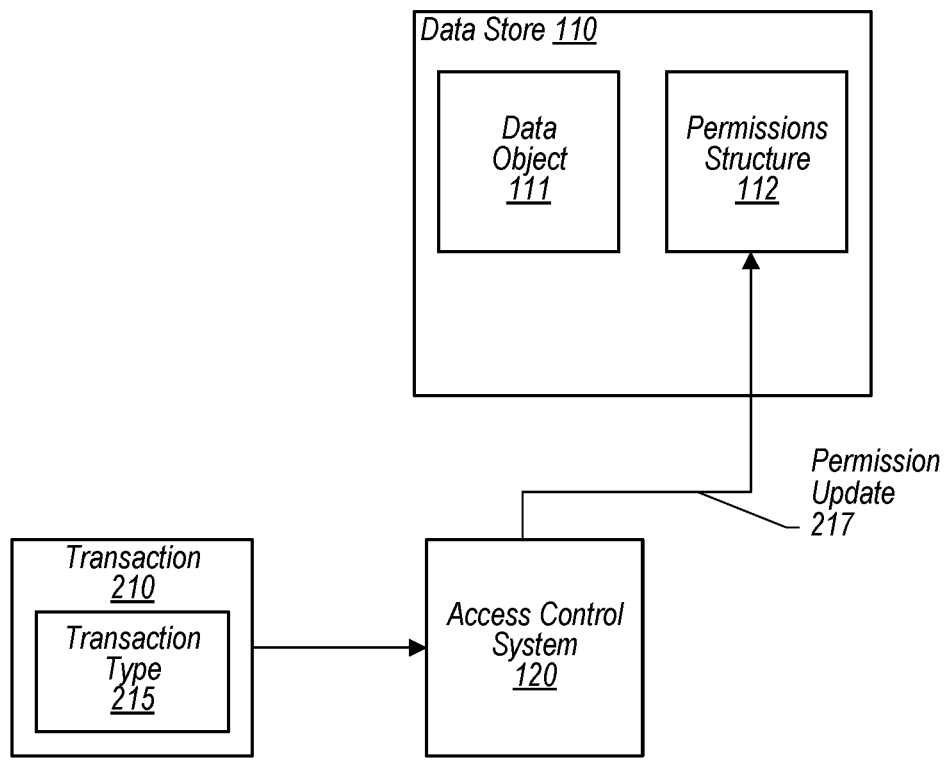
FIG. 2A is a block diagram illustrating an example permission structure that can be used to control access to a corresponding data object, according to some embodiments.
FIG. 2B is a block diagram illustrating an example transaction that is received by the access control system to update a permission structure, according to some embodiments.

Turning now to FIG. 2A, a block diagram of an example permissions structure 112 that can be used to control access to a corresponding data object 111 is shown. The diagram shown in FIG. 2A illustrates an example of record access data stored in permissions structure 112 and how permission to access data of data object 111 is determined based on the record access data and a matching of the account IDs of data object 111 to those of permissions structure 112. In some embodiments, there may be additional data structures that assist in controlling access to the data in data object 111. For example, there may be an object record table having additional metadata about each row/record in data object 111, such as the date that a record in data object 111 was created or last accessed. In some embodiments, permissions structure 112 can map to multiple data objects 111 and/or data object 111 may map to multiple permissions structures 112.

As shown, data object 111 is a database table containing data relating to an account ID field, an owner field, and an account name field. Data object 111 can include other fields under which text-based data (e.g., lists, URLs, records, reports), audio files, video files, etc. may be stored. In some embodiments, the data of a field may point to items (e.g., using URLs) hosted on other computer systems. In the illustrated embodiment, data object 111 includes an account record for a company called "Acme" (specified under the account name filed) and is associated with account ID of "A1" and an owner, Maria who may be an administrator for a tenant having that account ID. Data in data object 111 may be manually uploaded by an administrator using, e.g., an online portal, but in other embodiments, data is automatically added subsequent to the execution of a service-related function. As an example, if Maria requests a report pertaining to Acme, that report may be automatically created and stored in a record of the illustrated data object 111 (or another data objects) as being associated with Account ID "A1" and owned by Maria.

As discussed, if a user requests access to one or more records of a particular data object 111, in various embodiments, access control system 120 looks up the relevant access rule(s) in permissions structure 112, instead of analyzing every access rule and record access inheritance in real time. In the illustrated embodiment, permissions structure 112 is a database table. As shown, each row in permissions structure 112 describes a user associated with an account ID and their access level and row cause. The user field describes the entities that can request access to data in data store 110, and the entities may be an individual (e.g., Maria) or a group of users under a tenant (e.g., the strategy department). "Access level" describes what the particular user is permitted to do (e.g., read, write, delete, create) when trying to modify or add to data object 111. "Row cause" is indicative of the process that led to the creation of the row in permissions structure 112: "manual" indicates that its row was manually added by an administrator, while "rule" indicates that its row was automatically added as a result of a rule-changing transaction. More columns may be added to permissions structure 112 that provide additional information with respect to, for example, the user (e.g., last time logged in, etc.).

Permissions structure 112 is used to control user access to data object 111 using various operations. In particular, a user of user system 130 may send a data request (e.g., open a record, run a report, access a list view, search for records, etc.) to access control system 120. That data request can specify the type of request (e.g., read, write, or delete), the user's name/group, and the account ID. When determining whether a record of data object 111 can be accessed by the user, in various embodiments, access control system 120 attempts to match the value stored in the record for the account ID field with a record stored in permissions structure 112. (In some embodiments, the matching is done through a join operation of data object 111 and permissions structure 112 using "account ID" as a key). Access control system 120 may search the record(s) of permission structure 112 that match the account ID to locate the user's record in permission structure 112. Access control system 120 may then compare the records' access level against the type of data request submitted by the user and decide whether to proceed with the request (e.g., updating the requested record). As an example, if a user of the strategy group attempts to update the record of data object 111 that is depicted in FIG. 2A, then access control system 120 will access the strategy group's record in permission structure 112 and deny the request as the strategy group does not have permission to write.

Turning now to FIG. 2B, a block diagram of an example transaction 210 that involves a permission update request 217 to update permissions structure 112 is shown. In the illustrated embodiment, there is data store 110, access control system 120, and transaction 210. As further shown, data store 110 includes data object 111 and permissions structure 112, and transaction 210 having a transaction type 215. The illustrated embodiment may be implemented differently than shown—e.g., transaction 210 may include additional information that describes the user associated with transaction 210.

In many cases, it may be desirable to change a user's or group's access to particular data at data store 110. For example, Maria may leave the company and Frank subsequently obtains her responsibilities. Consequently, a user (e.g., an administrator of that company) may update the access rules to their data to remove permissions from Maria and grant them to Frank, which involves recomputing permissions structure 112 to reflect the changes. In various embodiments permissions structure 112 is updated using a rule-changing transaction 210 having a transaction type 215 corresponding to the particular changes made to the access granted to users or groups. In various embodiments, transaction type 215 is can be one of the following types: access rule recalculation/child implicit shares processing, group membership change and scrutinizes, role reparenting operation, account merge operation, organization-wide default change, portal implicit sharing change, and user visibility statistics collection. Several of these types 215 are described below—there may be other transaction types 215.

With respect to access rule recalculations, in some embodiments, the administrators of data store 110 or tenants of system 100 may desire to recompute a portion or all existing record access data already precomputed in permissions structure 112. This transaction type 215 may be executed in response to a user being granted more or less access to a particular set of records. Access rule recalculations may become too unbounded due to various causes. For example, if a tenant has few users but millions of records, record access rule recalculation can be resource intensive due to the large number of records. With respect to child implicit share processing, in various embodiment, child implicit sharing is the ability of a parent account to access all the records that its child account can. Precomputing the record access data may involve granting the parent account all the permissions of the child account, resulting in more record access data being stored in permission structure 112. Such processing may become unbounded in cases in which a parent account is associated with a large number of child accounts.

With respect to group membership change, in various embodiments, a set of users may form a group, which itself can have subgroups. The groups and subgroups may have respective rules, and all users within a given group or sub-group receive the group's rule. Accordingly, a group membership change transaction 210 may be performed in response to any change in the groups or their compositions (e.g., moving a sub-group from one group to another, removing a user from a group, or moving users from one group to another). Such transactions 210 may be unbounded in cases in which multiple large groups are merged into a single group.

With respect to role reparenting, in various embodiments, roles are sets of access levels (e.g., read, create, edit, delete) to records data object 111, and can be granted to a user or group of users. As an example, a "viewer" role may be created to give read access to all records and subsequently be granted to users (e.g., Maria, Frank, etc.). As with groups, roles may have a hierarchy to them. In some embodiments, roles map to an organization's formal hierarchy (e.g., the CEO may have a level 1 role, middle managers may have level 5 roles, etc.). If a role within the hierarchy needs to move from one hierarchy position to another position, then all roles that are lower on the hierarchy than the given role must also be moved. Thus, if a given hierarchy possesses ten levels, then moving a level 8 role to level 3 requires moving level 9 and 10 roles as well. Roles may be assigned to multiple users, and a role reparenting of a given role involves a recalculation for all users within the role and lower roles connected to that role.

With respect to account merge, in various embodiments, it may be desirable to merge a set of accounts. For example, Maria may leave an organization and thus it may be desirable to merge her accounts with the accounts of another user at the organization. Those accounts may have millions of child records and therefore it an account merge transaction 210 may become unbounded when recomputing the record access data of permissions structure 112 to grant the other user access those records.

As a part of performing transaction 210, in various embodiments, access control system 120 issues permission update requests 217 to update permissions structure 112. For example, access control system 120 may recompute a new portion of record access data and then issue a permission update request 217 to store the new portion in permissions structure 112. By precomputing and storing record access data in permissions structure 112 when a rule-changing transaction 210 occurs, access control system 120 may be able to more quickly determine if a user is permitted to access certain records instead of computing the record access data in real-time at the reception of a data request.

Figure 3:
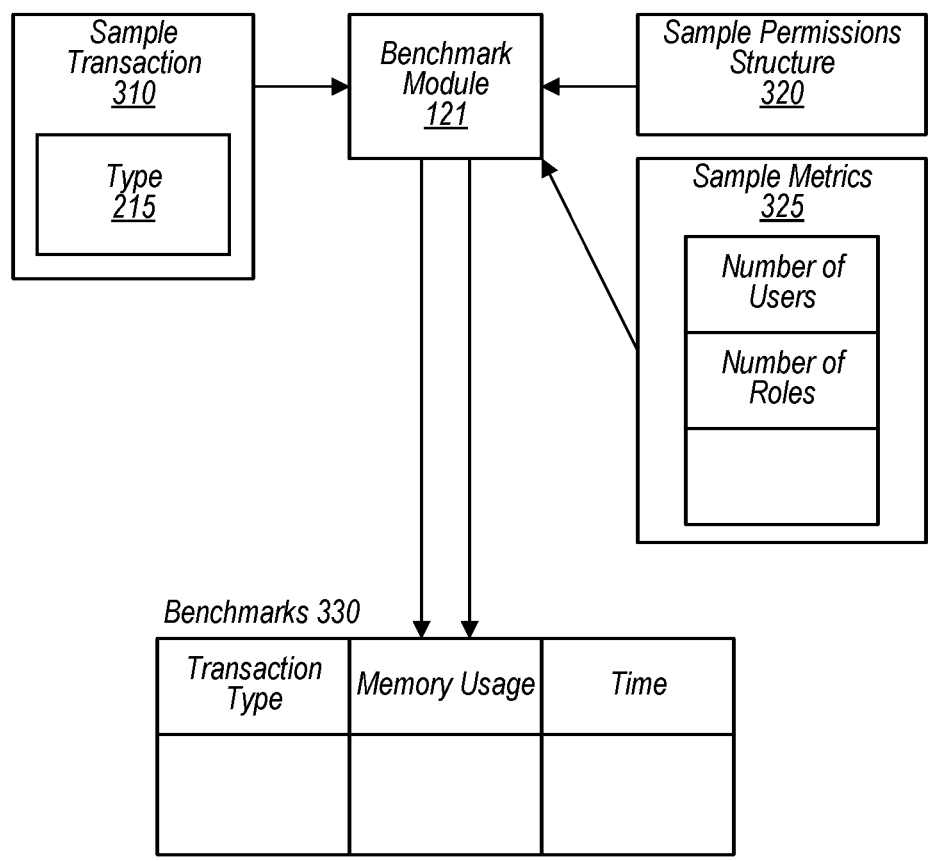
FIG. 3 is a block diagram illustrating an example benchmarking of a sample transaction, according to some embodiments.

Turning now to FIG. 3, a block diagram of an example architecture for benchmarking of rule-changing transactions is shown. In the illustrated embodiment, there is benchmark module 121, a sample transaction 310, a sample permissions structure 320, sample metrics 325, and benchmarks 330. As shown, sample transaction 310 includes a type 215, and benchmarks 330 have a transaction type field, memory usage field, and time field. The illustrated embodiment may be implemented differently than shown—e.g., benchmarks 330 may include an additional field that describes the computing region in which a transaction was conducted.

As discussed, in various embodiments, to predict whether a transaction 210 will exceed a system resource threshold, metrics are collected for a tenant (e.g., an organization) of system 100 that map to individual components of a defined formula. In order to determine which and how metrics affect a particular type 215 of transaction 210, benchmarking may be carried out to identify cases in which transactions 210 of that particular type 215 exceed a system resource threshold. Those cases may then be analyzed to determine values for the metrics associated the particular type 215 that are likely to cause a transaction 210 of the particular type 215 to exceed the system resource threshold. A formula may further be derived from those cases into which the metrics can be inputted to predict whether a rule-changing transaction 210 of the particular type 215 will exceed the system resource threshold.

To benchmark a particular type 215, in various embodiments, benchmark module 121 executes a set of sample transactions 310 of that particular type 215. For example, benchmark module 121 may execute sample role reparenting transactions 310 to benchmark the resource consumption of role reparenting transactions 210. In order to facilitate that benchmarking, in various embodiments, benchmark module 121 utilizes sample permissions structures 320 and sample metrics 325. Sample permissions structure 320 is a permission structure 112 used for benchmarking, and sample metrics 325 includes sample numbers of users, roles, etc., that may assist in deriving the individual components of formulae that can be used to predict the resource consumption of future transactions (e.g., transactions 210) on permissions structures 112. In various embodiments, metrics 325 include the number of roles, the depth of a role hierarchy, the number of all tenant records, the number of groups, the number of tenant records under an account, etc.

When a sample transaction 310 is complete, performance results (e.g., time and memory usage) are stored in benchmarks 330 in association with the particular type 215 of that sample transaction 310. After sufficient performance results are stored for a given type 215, it may be possible to establish a formula for that type 215. Formulae for transaction types 215 that were previously described with respect to FIG. 2B can be created. For example, the formula for role reparenting transactions 210 may be as follows: $(1+n) \cdot 2048 \cdot d + ((1+u) \cdot 1024 \cdot d) + ((E) \cdot 2048) <= M$, where n is the number of roles being represented, d is the depth of the role hierarchy for the new parent, u is the number of users in the source role, E is the count of all entity records owned by the source roles, and M is the system memory threshold, or the maximum amount of memory that may be provided for the execution of the transaction. As another example, a formula for group membership change transactions 210 may be as follows: $(((1+n)*1200*d)+((E)*2048)) <= M$, where d is the depth of the role hierarchy for the parent of the groups being changed, d is the depth of the role hierarchy, and M is the system memory threshold.

In some embodiments, this benchmarking is done with execution module 124 executing sample transactions 310 on sample permissions structure 320 and then storing the performance results in benchmark module 121. But in other embodiments, an isolated benchmarking system is used to ensure the absence of external factors (e.g., user system 130 accessing other elements of access control system 120) during performance measurements.

Figure 4:
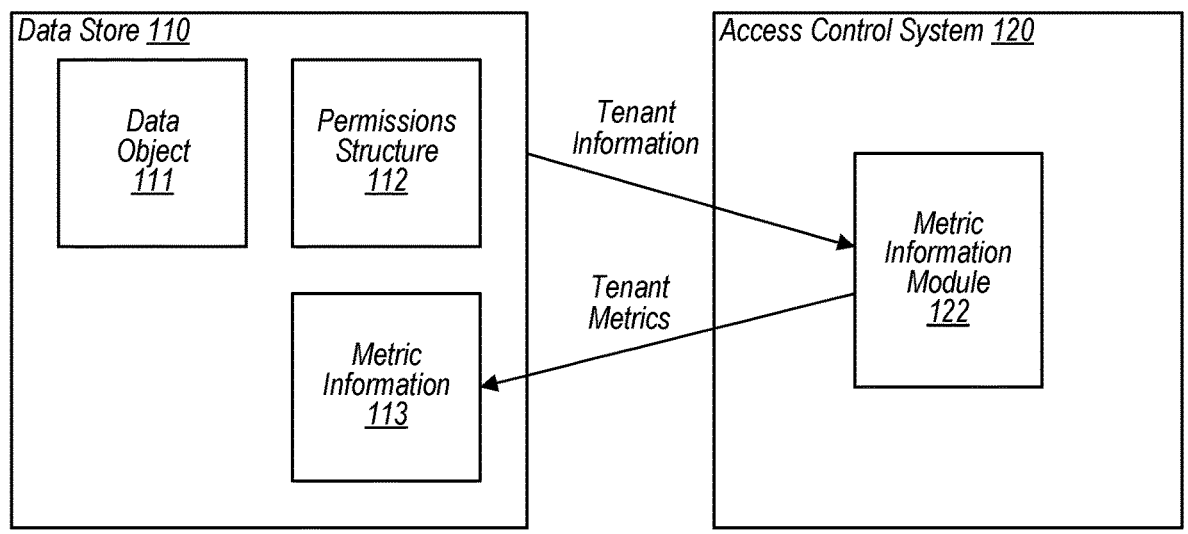
FIG. 4 is a block diagram illustrating an example process of creating metric information, according to some embodiments.

Turning now to FIG. 4, a block diagram of an example collection of metric information 113 is shown. In the illustrated embodiment, there is access control system 120 and data store 110. As further shown, data store 110 includes data object 111, permissions structure 112, and metric information 113, and access control system 120 includes metric information module 122. The illustrated embodiment may be implemented differently than shown. For example, metric information 113 may be stored separately from data store 110.

Metric information 113, in various embodiments, includes values for a set of parameters (e.g., the parameters of the previously discussed formulae) involved in the different types 215 of transactions 210 (e.g., role reparenting) that can be performed to recompute permissions structure 112. Metric information 113 may store, for a tenant, the number of users of the tenant, the number of roles of the tenant, the number of records of the tenant, the role hierarchy of the tenant, etc. In particular, each tenant can possess its own users and user hierarchies, and as a result, transactions 210 that recompute permissions structure 112 can depend on specific tenant information. As such, metric information module 122, in various embodiments, implements a metric collection process to collect the values for the set of parameters for the different tenants of system 100. That information may be stored at data store 110 and thus metric information module 122 may access it from data store 110 (shown as tenant information) and then rearrange that information into a format that permits the values of the individual components of a formula to be extracted from the information and used in the formula to predict whether a corresponding rule-changing transaction 210 will exceed a system resource threshold.

Figure 5:
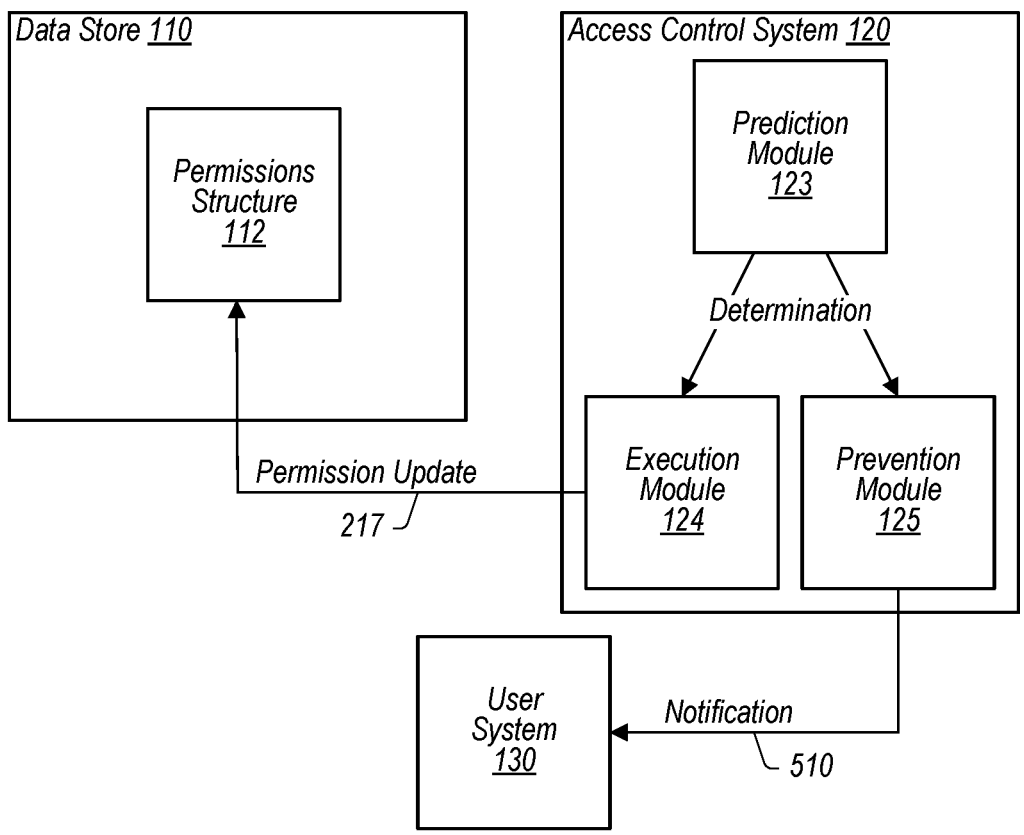
FIG. 5 is a block diagram illustrating an example process to predict whether to permit a transaction to execute, according to some embodiments.

Turning now to FIG. 5, a block diagram of an example process for predicting whether to permit a transaction 210 to execute is shown. In the illustrated embodiment, there is data store 110, access control system 120, and user system 130. As further shown, data store 110 includes permissions structure 112, and access control system 120 has prediction module 123, execution module 124, and prevention module 125. The illustrated embodiment might be implemented differently than depicted—e.g., access control system 120 might receive a request to perform a transaction 210 from a non-user system and therefore provide notification 510 to that system instead of user system 130.

As discussed, access control system 120 can receive a request to perform a transaction 210 to recompute record access data of permissions structure 112. In response to receiving the request, in various embodiments, prediction module 123 makes a determination on whether to permit the transaction 210 to execute or to prevent it. To make that determination, prediction module 123 uses relevant metrics from metric information module 122 (not shown) as input in the formula corresponding to the transaction's type 215. In particular, prediction module 123 may access the metrics of the tenant associated with the transaction 210 and check whether the metrics exceed particular limits (e.g., the number of roles is greater than a role threshold, such as 100 roles) or the output value of the formula exceeds a particular system resource threshold (e.g., a role reparenting transaction is predicted to consume more than 8 GB of memory). For example, prediction module 123 may predict the outcome of a role reparenting transaction 210 on permissions structure 112 using relevant metrics from metric information module 122 and the corresponding role reparenting formula to predict the resource consumption of the role reparenting transaction 210. In some embodiments, the formula is not used and instead the metrics stored in metric information module 122 are directly compared against metric limits to make the same determination (i.e., whether to proceed with the transaction 210).

If the predicted performance of the transaction 210 does not exceed the system resource threshold (e.g., a role reparenting operation predicted to consume less 8 GB of memory), then prediction module 123 instructs execution module 124 to execute the transaction 210 to update permissions structure 112 via one or more permission update requests 217, as the transaction 210 has been determined to consume an appropriate number of resources. Conversely, if the predicted resource consumption indicates that the transaction 210 exceeds the threshold, then prediction module 123 instructs prevention module 125 to prevent the transaction 210 and also provide user system 130 with a notification 510 that the attempted transaction 210 will exceed available computing resources.

In various embodiments, notification 510 includes suggestions to enable the transaction 210 to be executed without exceeding the system resource threshold. For example, notification 510 may indicate that the tenant has too many roles and should reduce the number of roles and then retry the transaction 210. As another example, notification 510 may indicate that there are too many child records associated with a certain account. As yet another example, notification 510 may include a message that informs the user of user system 130 that their membership tear is too low. That is, a tenant of a certain membership tier may have a threshold on transactions (e.g., 4 GB) that is lower than the system resource threshold (e.g., 8 GB). Accordingly, the lower threshold might be used to determine whether the execution of a rule-changing transaction 210 will proceed, and thus the tenant may be instructed to choose a higher membership tier.

Figure 6:
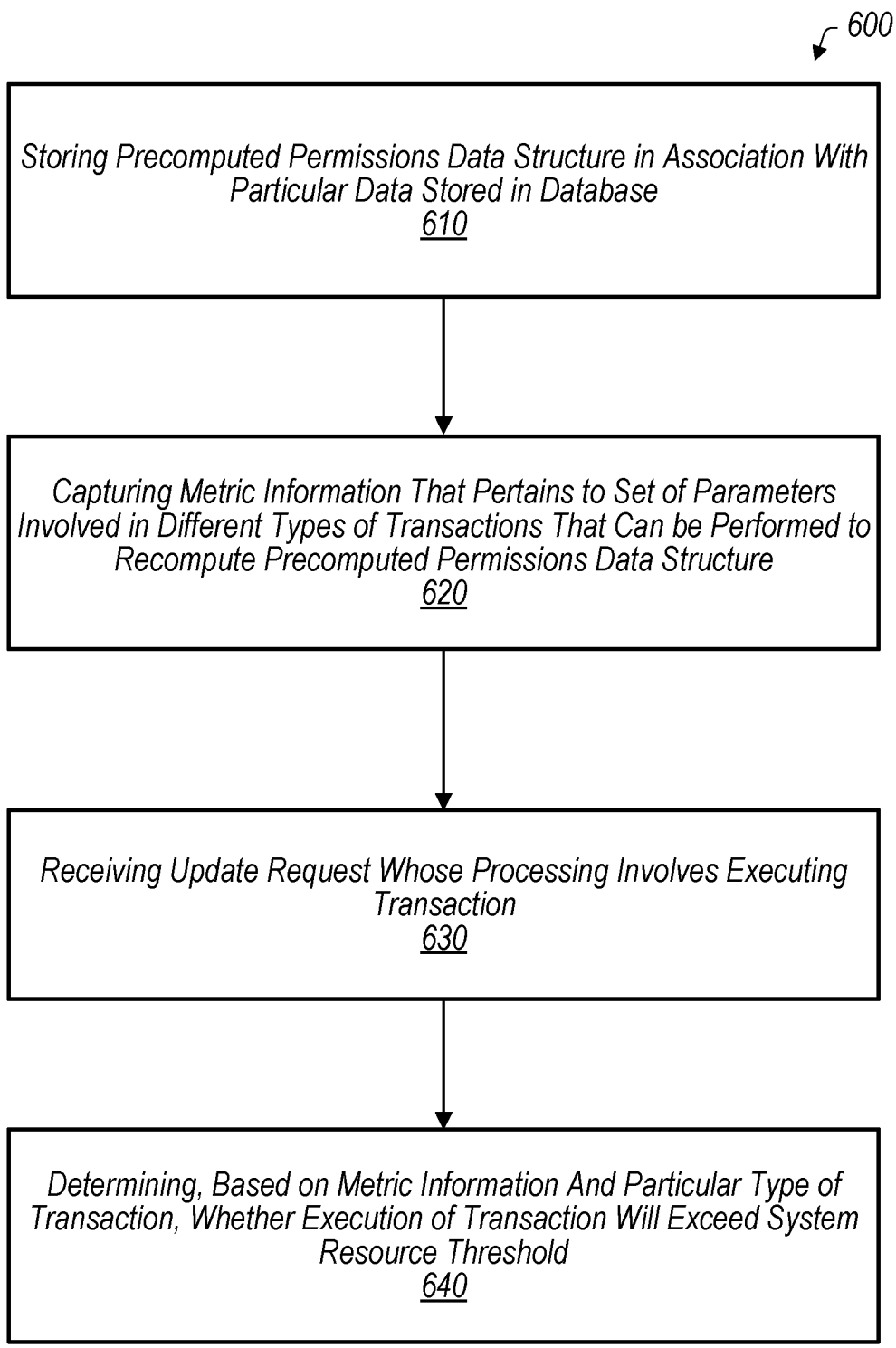
FIG. 6 is a flow diagram illustrating example method relating to determining whether a transaction that includes recomputing a precomputed permissions data structure will exceed a system resource threshold, according to some embodiments.

Turning now to FIG. 6, a flow diagram of a method 600 is shown. Method 600 is one embodiment of a method performed by a computer system (e.g., access control system 120) to determine whether to proceed with a transaction (e.g., transactions 210). Method 600 may be performed by executing a set of program instructions stored on a non-transitory computer-readable medium. In some embodiments, method 600 includes more or less steps than shown. For example, method 600 may include an additional step in which the system notifies the issuer of the transaction request that the execution of the transaction will exceed the system resource threshold.

Method 600 begins in step 610 with the computer system storing the precomputed permissions data structure (e.g., permissions structure 112) in association with particular data stored (e.g., data object 111) in a database (e.g., data store 110). The precomputed permissions data structure may be usable to determine whether a user can access the particular data when processing a data request that is directed at the particular data. In some embodiments, the database stores data in the form of tables. For example, the precomputed permissions data structure may be a table that includes access rules for a set of users and is linked to a separate table having the particular data.

In step 620, the computer system captures metric information (e.g., metric information 113) that pertains to a set of parameters involved in different types of transactions that can be performed to recompute the precomputed permissions data structure. The metric information may also pertain to specific tenants of the computer system. In some cases, the database stores data for a plurality of tenants of the computer system, and the metric information specifies, for a given one of the plurality of tenants, tenant-specific values for the set of parameters.

In step 630, the computer system receives an update request whose processing involves executing the transaction. The transaction is of a particular one of the different types (e.g., role reparenting) of transactions that can be performed to recompute the precomputed permissions data structure. In some embodiments, the transaction includes a group membership change operation that involves modifying a number of users that is included in a particular group that is permitted to access at least a portion of the particular data. Furthermore, in some cases, the metric information for the group membership change operation identifies a number of records that are managed by users in the particular group.

Determining parameters involved in the types of transactions may be accomplished prior to the update request. For example, the system may execute one or more test transactions of the particular type of transaction, and capture during the execution of the test transactions benchmark metric information pertaining to a resource consumption for the particular type of transaction. A particular set of parameters involved in the particular type of transaction may be derivable from the benchmark metric information.

In step 640, the computer system determines based on the metric information and the particular type of the transaction, whether an execution of the transaction will exceed the system resource threshold. The system resource threshold, in some embodiments, corresponds to an amount of memory that is permitted by the computer system to be used when executing a given transaction.

The determination may be made by the computer system based on stored metadata. In some embodiments, the computer system stores limit metadata describing value limits for ones of the set of parameters and prevents the execution of the transaction in response to determining that a value of a parameter associated with the transaction exceeds a value limit identified by the limit metadata for that parameter. In further embodiments, the system may additionally store membership metadata describing the account information of one or more of a set of tenants. The limit metadata may be determined based on the membership data.

The computer system may execute additional steps after the determination. For example, the computer system may, in response to determining that the execution of the transaction will exceed the system resource threshold, prevent the execution of the transaction, and provide, to an issuer of the update request, a notification (e.g., notification 510) that the execution of the transaction has been prevented. The notification may identify one or more solutions to enable the transaction to be subsequently executed.

Exemplary Computer System

Figure 7:
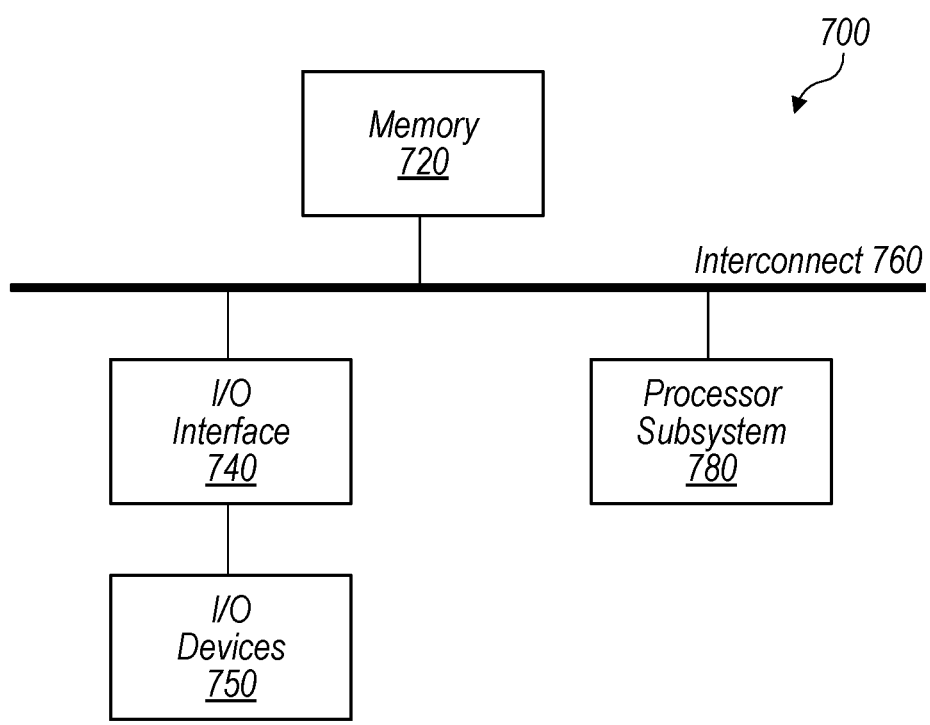
FIG. 7 is a block diagram illustrating elements of a computer system for implementing various systems described in the present disclosure, according to some embodiments.

Turning now to FIG. 7, a block diagram of an exemplary computer system 700, which may implement system 100, data store 110, access control system 120, and/or user system 130, is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780. In some embodiments, program instructions that when executed implement benchmark module 121, metric information module 122, prediction module 123, execution module 124, and/or prevention module 125 may be included/stored within system memory 720.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]— is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method for determining whether a transaction that includes recomputing a precomputed permissions data structure will exceed a system resource threshold, the method comprising:
   storing, by a computer system, the precomputed permissions data structure in association with particular data stored in a database, wherein the precomputed permissions data structure is usable to determine whether a user can access the particular data when processing a data request that is directed at the particular data;
   capturing, by the computer system, metric information that pertains to a set of parameters involved in different types of transactions that can be performed to recompute the precomputed permissions data structure;
   receiving, by the computer system, an update request whose processing involves executing the transaction, wherein the transaction is of a particular one of the different types of transactions that can be performed to recompute the precomputed permissions data structure; and
   determining, by the computer system based on the metric information and the particular type of the transaction, whether an execution of the transaction will exceed the system resource threshold.

2. The method of claim 1, wherein the precomputed permissions data structure is a table that includes access rules for a set of users and is linked to a separate table having the particular data.

3. The method of claim 1, further comprising:
   in response to determining that the execution of the transaction will exceed the system resource threshold, the computer system:
   preventing the execution of the transaction; and
   providing, to an issuer of the update request, a notification that the execution of the transaction has been prevented, wherein the notification identifies one or more solutions to enable the transaction to be executed.

4. The method of claim 1, wherein the database stores data for a plurality of tenants of the computer system, and wherein the metric information specifies, for a given one of the plurality of tenants, tenant-specific values for the set of parameters.

5. The method of claim 1, further comprising:
   executing, by the computing system, one or more test transactions of the particular type of transaction; and
   as a part of executing the one or more test transactions, the computer system capturing benchmark metric information pertaining to a resource consumption for the particular type of transaction, wherein a particular set of parameters involved in the particular type of transaction are derivable from the benchmark metric information.

6. The method of claim 1, wherein the transaction includes a group membership change operation that involves modifying a number of users that is included in a particular group that is permitted to access at least a portion of the particular data.

7. The method of claim 6, wherein the metric information identifies a number of records that are managed by users in the particular group.

8. The method of claim 1, wherein the system resource threshold corresponds to an amount of memory that is permitted by the computer system to be used when executing a given transaction.

9. The method of claim 1, further comprising:
storing, by the computer system, limit metadata describing value limits for ones of the set of parameters; and
preventing, by the computer system, the execution of the transaction in response to determining that a value of a parameter associated with the transaction exceeds a value limit identified by the limit metadata for that parameter.

10. A non-transitory computer readable medium having program instructions stored thereon that are executable by a computer system to cause the computer system to perform operations comprising:
storing a precomputed permissions data structure in association with particular data stored in a database, wherein the precomputed permissions data structure is usable to determine whether a user can access the particular data when processing a data request that is directed at the particular data;
capturing metric information that pertains to a set of parameters involved in different types of transactions that can be performed to recompute the precomputed permissions data structure;
receiving an update request whose processing involves executing a transaction, wherein the transaction is of a particular one of the different types of transactions that can be performed to recompute the precomputed permissions data structure; and
determining based on the metric information and the particular type of the transaction, whether an execution of the transaction will exceed a system resource threshold.

11. The non-transitory computer readable medium of claim 10, wherein the operations further comprise:
in response to determining that the execution of the transaction will exceed the system resource threshold:
preventing the execution of the transaction; and
providing, to an issuer of the update request, a notification that the execution of the transaction has been prevented, wherein the notification identifies one or more solutions to enable the transaction to be executed.

12. The non-transitory computer readable medium of claim 10, wherein the operations further comprise:
executing, one or more test transactions of the particular type of transaction; and
as a part of executing the one or more test transactions, capturing benchmark metric information pertaining to a resource consumption for the particular type of transaction, wherein a particular set of parameters involved in the particular type of transaction are derivable from the benchmark metric information.

13. The non-transitory computer readable medium of claim 10, wherein the operations further comprise:
storing limit metadata describing value limits for ones of the set of parameters; and
preventing the execution of the transaction in response to determining that a value of a parameter associated with the transaction exceeds a value limit identified by the limit metadata for that parameter.

14. The non-transitory computer readable medium of claim 10, wherein the metric information specifies, for a given one of a plurality of tenants that are hosted by the computer system, values for the set of parameters that are specific to the given tenant.

15. The non-transitory computer readable medium of claim 10, wherein the system resource threshold corresponds to an amount of processing capability that is permitted by the computer system to be used when executing a given transaction.

16. A system, comprising:
at least one processor; and
memory having program instructions stored thereon that are executable by the at least one processor to cause the system to perform operations comprising:
storing a precomputed permissions data structure in association with particular data stored in a database, wherein the precomputed permissions data structure is usable to determine whether a user can access the particular data when processing a data request that is directed at the particular data;
capturing metric information that pertains to a set of parameters involved in different types of transactions that can be performed to recompute the precomputed permissions data structure;
receiving an update request whose processing involves executing a transaction, wherein the transaction is of a particular one of the different types of transactions that can be performed to recompute the precomputed permissions data structure; and
determining based on the metric information and the particular type of the transaction, whether an execution of the transaction will exceed a system resource threshold.

17. The system of claim 16, wherein the operations further comprise:
in response to determining that the execution of the transaction will exceed the system resource threshold:
preventing the execution of the transaction; and
providing, to an issuer of the update request, a notification that the execution of the transaction has been prevented, wherein the notification identifies one or more solutions to enable the transaction to be executed.

18. The system of claim 16, wherein the operations further comprise:
executing one or more test transactions of the particular type of transaction; and
as a part of executing the one or more test transactions, capturing benchmark metric information pertaining to a resource consumption for the particular type of transaction, wherein a particular set of parameters involved in the particular type of transaction are derivable from the benchmark metric information.

19. The system of claim 16, wherein the operations further comprise:
storing limit metadata describing value limits for ones of the set of parameters; and
preventing the execution of the transaction in response to determining that a value of a parameter associated with the transaction exceeds a value limit identified by the limit metadata for that parameter.

20. The system of claim 16, wherein the metric information specifies, for a given one of a plurality of tenants that are hosted by the system, values for the set of parameters that are specific to the given tenant.

* * * * *